United States Patent
Guercioni

(10) Patent No.: US 7,941,910 B2
(45) Date of Patent: May 17, 2011

(54) METHOD FOR REMOVING WINDING CONDUCTORS FROM A TWISTING MACHINE AND PLACING THEM IN A ROTOR STATOR STACK

(75) Inventor: Sante Guercioni, Teramo (IT)

(73) Assignee: Tecnomatic S.p.A., Teramo, Corropoli (IT)

( * ) Notice: Subject to any disclaimer, the term of this patent is extended or adjusted under 35 U.S.C. 154(b) by 1064 days.

(21) Appl. No.: 11/728,258

(22) Filed: Mar. 22, 2007

(65) Prior Publication Data

US 2009/0265909 A1    Oct. 29, 2009

(51) Int. Cl.
  *H02K 15/08* (2006.01)
  *H02K 15/09* (2006.01)
(52) U.S. Cl. ............... 29/596; 29/598; 29/735; 310/201
(58) Field of Classification Search ............... 29/596, 29/598, 732, 735; 310/201
  See application file for complete search history.

(56) References Cited

U.S. PATENT DOCUMENTS

| | | | |
|---|---|---|---|
| 1,332,154 A | 2/1920 | Apple | |
| 1,555,931 A | 10/1925 | Apple | |
| 2,387,885 A | 10/1945 | Davis | |
| 2,400,739 A | 5/1946 | Burge | |
| 2,476,743 A | 7/1949 | Leece | |
| 2,476,745 A * | 7/1949 | Leece | 72/427 |
| 3,803,951 A | 4/1974 | Bagley | |
| 3,999,093 A | 12/1976 | Kirtley, Jr. | |
| 4,437,230 A | 3/1984 | Greutmann | |
| 5,192,087 A | 3/1993 | Kawashima et al. | |
| 5,266,858 A | 11/1993 | Ohmi et al. | |
| 5,363,546 A | 11/1994 | Bradtmueller et al. | |
| 5,495,131 A | 2/1996 | Goldie et al. | |
| 5,522,125 A | 6/1996 | Bradtmueller et al. | |
| 5,998,903 A | 12/1999 | Umeda et al. | |
| 6,144,136 A | 11/2000 | Umeda et al. | |
| 6,249,956 B1 | 6/2001 | Maeda et al. | |
| 6,260,898 B1 | 7/2001 | Kano et al. | |
| 6,314,780 B1 | 11/2001 | Naka et al. | |
| 6,339,871 B1 | 1/2002 | Maesoba et al. | |
| 6,557,239 B2 | 5/2003 | Takahashi et al. | |
| 6,698,983 B1 | 3/2004 | Kiernan et al. | |
| 6,885,123 B2 | 4/2005 | Gorohata et al. | |
| 6,938,323 B2 | 9/2005 | Katou et al. | |

(Continued)

FOREIGN PATENT DOCUMENTS

EP       0881752       1/2001

(Continued)

*Primary Examiner* — Livius R Cazan
(74) *Attorney, Agent, or Firm* — Blakely Sokoloff Taylor & Zafman LLP

(57) ABSTRACT

Method for removing winding conductors from a twisting machine and placing them in a rotor or stator stack. For a plurality of rectangular winding conductors each having a pair of legs separated by an amount equal to the distance between a predetermined number of rotor or stator slots in which they will be inserted, moving a plurality of fingers of a clamping assembly between the legs of a plurality of winding conductors in a twisting fixture to retain the winding conductors, moving the clamping assembly away from the twisting fixture to withdraw the winding conductors from the twisting fixture, providing relative movement of the clamping assembly and a rotor or stator to insert free ends of the winding conductors into a rotor or stator, and moving the fingers of a clamping assembly from between the legs of a plurality of winding conductors. A preferred embodiment of the method is disclosed.

11 Claims, 8 Drawing Sheets

U.S. PATENT DOCUMENTS

| | | |
|---|---|---|
| 7,140,098 B2 | 11/2006 | Maeda et al. |
| 7,210,215 B2 | 5/2007 | Kato et al |
| 7,293,350 B2 | 11/2007 | Sawada |
| 7,302,750 B2 | 12/2007 | Niimi et al. |
| 2001/0007169 A1 | 7/2001 | Takahashi et al. |
| 2001/0013167 A1 | 8/2001 | Maeda et al. |
| 2002/0053126 A1 | 5/2002 | Maeda et al. |
| 2004/0172805 A1 | 9/2004 | Tokizawa |
| 2005/0166393 A1 | 8/2005 | Sawada |

FOREIGN PATENT DOCUMENTS

| | | |
|---|---|---|
| EP | 1376816 | 1/2004 |
| JP | 59-103546 | 6/1984 |
| JP | 60-241748 | 11/1985 |
| WO | WO-92/06527 | 4/1992 |
| WO | WO-98/54823 | 12/1998 |

* cited by examiner

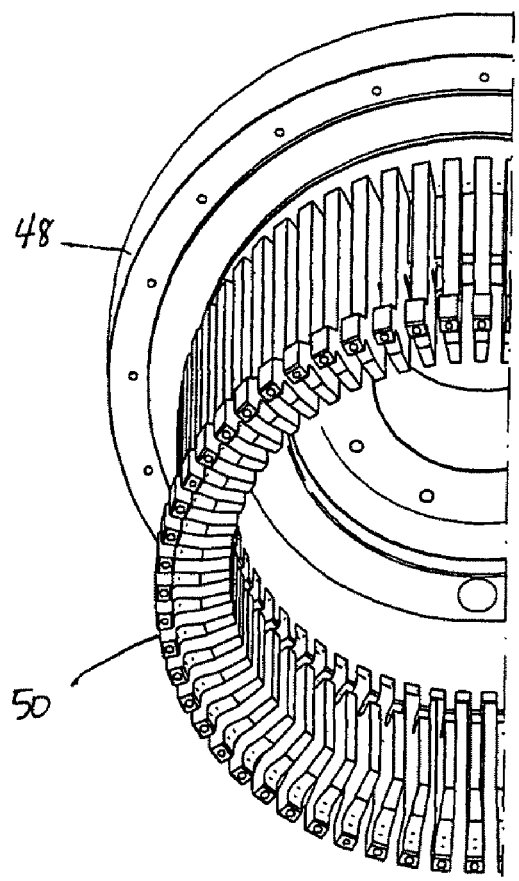
Fig. 10
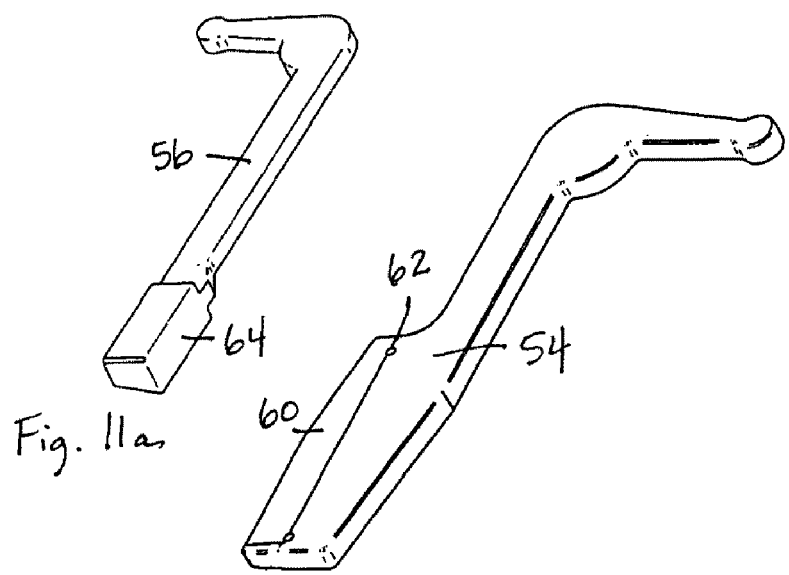
Fig. 11a
Fig. 11b

METHOD FOR REMOVING WINDING CONDUCTORS FROM A TWISTING MACHINE AND PLACING THEM IN A ROTOR STATOR STACK

BACKGROUND OF THE INVENTION

1. Field of the Invention

The present invention relates to the field of electric motors.

2. Prior Art

Tecnomatic S.p.A., assignee of the present invention, has in the past made a limited number of motor stators and D.C. motor rotors using flat or square wire for the windings. In that regard, it is to be noted that as used herein, "flat" or "square" wire means wire having four substantially flat sides, each joined to adjacent sides, typically by a rounded edge. In the case of square wire, the wire may be formed in the square shape and then coated with typical winding insulation, or in some cases, pre-coated round wire has been rolled into the square shape. Rolling of round wire to a square shape has definite limits if the insulation is not to be damaged, though smaller rounded edges may be achieved if the wire is first formed by drawing or otherwise formed into the square shape and then coated. Even if the wire is first formed in the desired shape and then coated, some degree of rounding on the edges is desired for various reasons, including prevention of surface tension from pulling the coating away from the sharp edges during coating, preventing the sharp edges from cutting through the coating afterward, and preventing electric field concentration on the sharp edges to induce early breakdown. Thus, as used herein, the words "square" or "flat" or equivalent words used to describe the cross-section of an insulated copper wire are used in the general sense and are not to be construed as excluding significant or substantial rounded corners joining the substantially flat sides. "Flat" as used herein and in the claims means having two opposite sides having a greater separation than the other two opposite sides, its width being greater than its thickness. "Straight" as used herein and in the claims means substantially free of bends. Accordingly, either a flat or a square conductor may or may not be straight. "Rectangular" as used herein is a more general term meaning flat or square, square being a special case of rectangular wherein the dimension between two opposite sides is equal to the dimension between the other two opposite sides.

In the prior art stators, the wire has been cut to the desired length and stripped, then bent into a hairpin shape by hand on a one at a time basis, then the two legs of the hairpin separated one hairpin at a time and hand inserted into one end of a stator, with the stripped ends of the wires sticking out of the other end of the stator being all bent all in one row uniformly in one direction and all in the adjacent row uniformly bent in the opposite direction so interconnection of wires in the two rows forming a given phase could be welded, one at a time, to provide the stator windings. However, to bring out the connections to the phases, and to interconnect phases, the corresponding wires needed to be re-bent to isolate them from the connections within each phase, something again previously done by hand.

The use of the flat or square wire for the windings produces very efficient and high power to weight ratio motors because of the greater cross-section of copper that can be put into a winding slot. However, the procedure described above is slow and highly labor intensive, and not suitable for a mass produced motor.

BRIEF DESCRIPTION OF THE DRAWINGS

FIG. 1 illustrates an exemplary hairpin conductor with ends stripped.

FIG. 10 illustrates a part of the body member of the clamping assembly of FIG. 8.

FIGS. 11a and 11b illustrate exemplary clamping fingers used in the clamping assembly of FIG. 8.

DETAILED DESCRIPTION OF THE PREFERRED EMBODIMENTS

The purpose of the present invention is to simultaneously remove all rectangular winding conductors from a twisting fixture and to place the same in the desired rotor or stator core. In particular, a rectangular insulated conductor with ends stripped is bent into a hairpin conductor 20 as shown in FIG. 1. Then all conductors required, except in the case of special length stator conductors used for phase connections in AC motors, are simultaneously bent into rotor or stator conductors 24 (FIG. 3) in the twisting fixture 22 of FIG. 2. After the twisting operation, the conductors 24 reside in fixture 22, with the fixture 22 having a sufficient depth so that the ends of conductors 24 are still within pockets within the fixture. In that regard, the word "pockets" as used herein is used in the general sense to include not only an enclosure on all sides but to further include slots which are open on one side.

Figure 4:
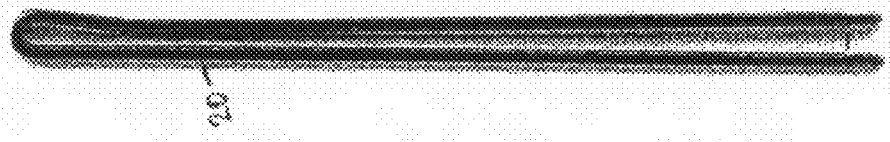
FIG. 4 is a top view of the overall system in which the exemplary embodiment of the present invention is used.
Figure 4:
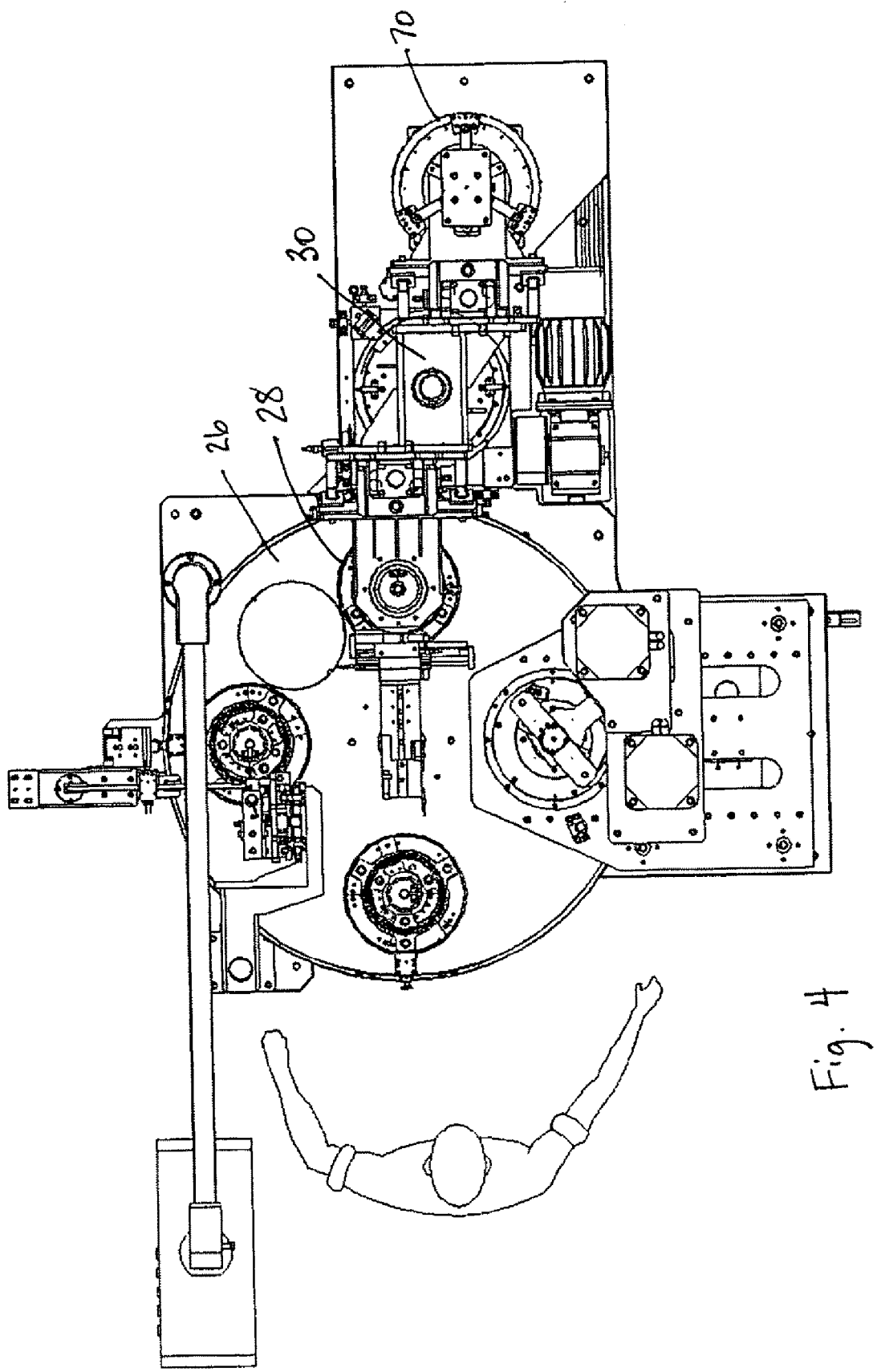

A top view of the overall system in which the present invention is used may be seen in FIG. 4. After the twisting operation, table 26 is rotated so that the fixture 22 will be at the winding conductor extraction station 28. In that regard, there is a second rotatable assembly 30, the function of which will subsequently be described.

Figure 5:
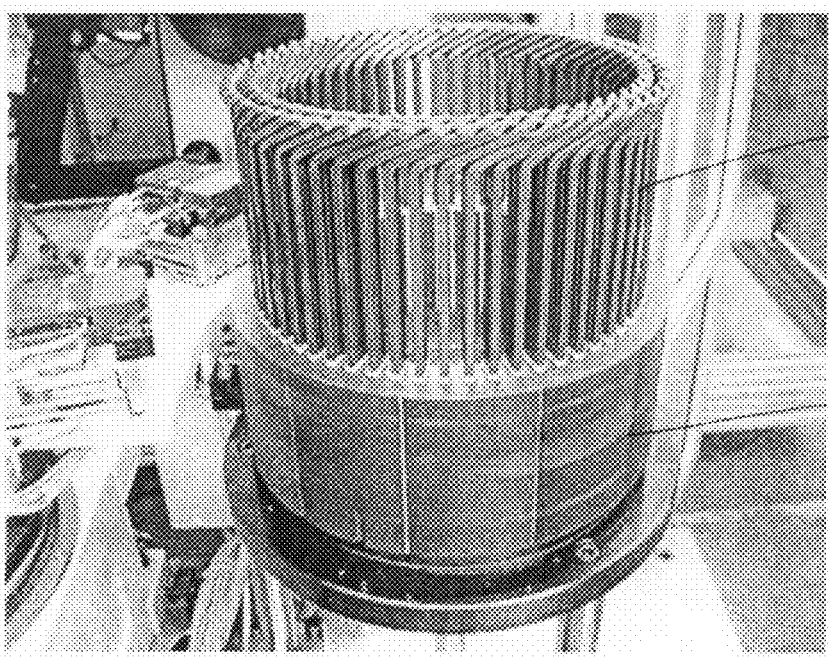
FIG. 5 shows a motor stator with winding conductors therein in an elevated state.

The first part of the extraction process is to raise the winding conductors 24 to provide access to the sides thereof and to provide support for the legs of the winding conductors reasonably close to the ends thereof so that the ends will remain accurately spaced even when removed from the fixture. The result of this operation is much like illustrated in FIG. 5, with all winding conductors 24 being substantially elevated in comparison to their position in fixture 22 in FIG. 2. FIG. 5, however, is illustrating the conductors 24 in a motor stator 32 rather than the fixture, though the Figure may be taken as representative of the position of the winding conductors in either the stator or fixture, depending upon what stage the extraction process is in.

Figure 6A:
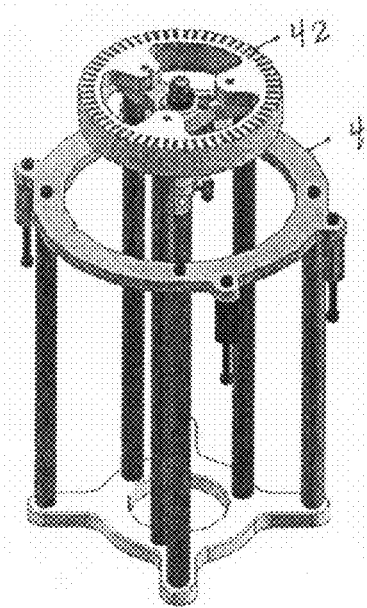
FIGS. 6a through 6d illustrate an extractor for extracting winding conductors from a twisting fixture.
Figure 6B:
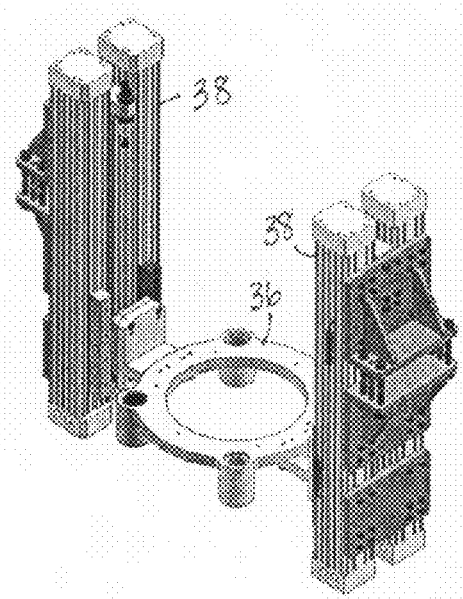
Figure 6C:
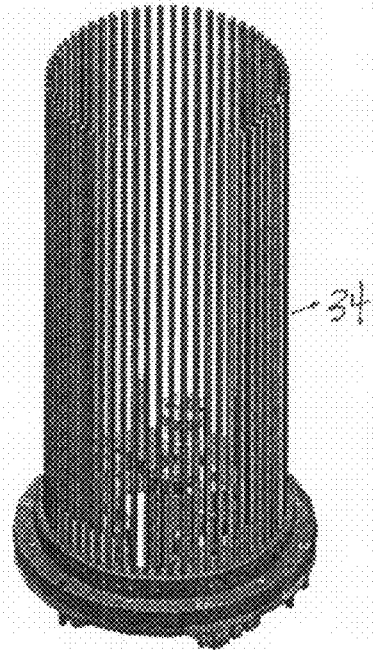
Figure 6D:
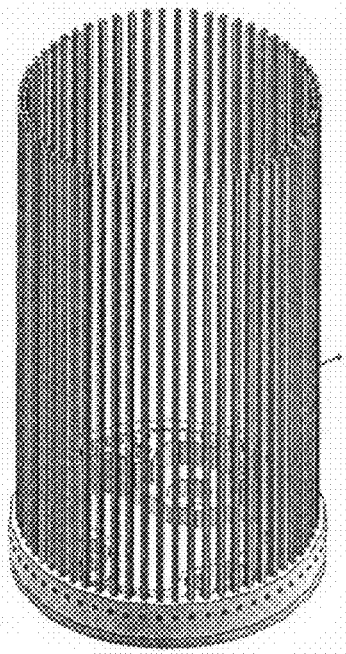
Figure 7:
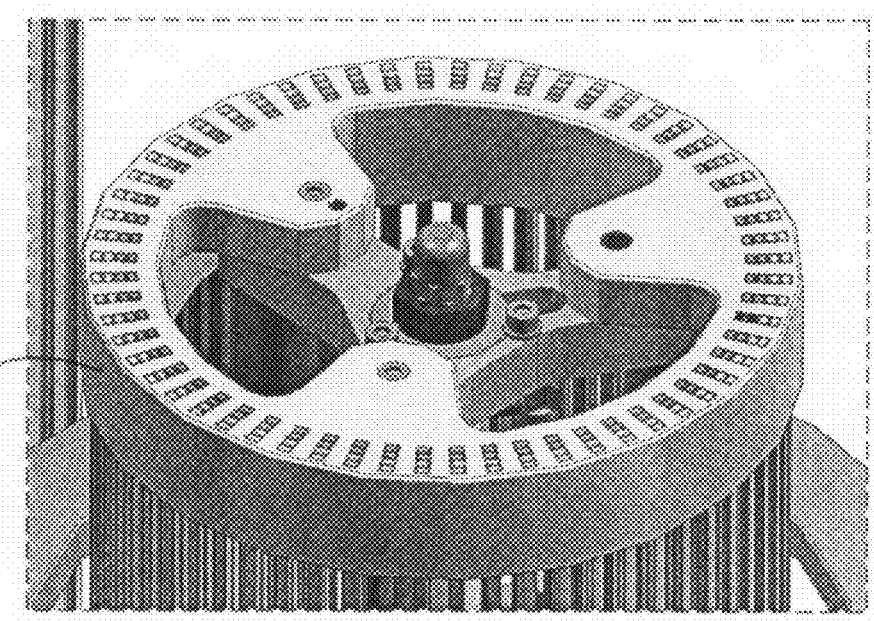
FIG. 7 is a view of a guide for the extractor of FIGS. 6a through 6d.

To elevate the winding conductors 24 in the fixture 22 at the extraction station 28, an extractor assembly is positioned immediately below the fixture, and of course, the fixture is accurately angularly indexed to that assembly. The major components of the extractor assembly may be seen in FIGS. 6a through 6d. In particular, an internal extractor 34 and an external extractor 36 which fits around the internal extractor may be seen in FIGS. 6c and 6d, respectively. These extractors are mounted on a support 36 (FIG. 6b) which may be moved up and down by actuators 38. An assembly 40 supports a guide 42 which guides the upper ends of the inner extractor 34 and the outer extractor 36 immediately below the fixture 22 (FIG. 2) to be sure that the individual extractor members are properly guided into the fixture 22. The guide 42 may be better seen in FIG. 7, which is a view thereof corresponding to FIG. 6, but taken on an expanded scale. Note that in the preferred embodiment twisting fixture 22, the inner and outer pockets are actually separated from each other by a wall, and accordingly, separate extractor elements 34 and 36 are provided. Once the extractor is raised, the upper end of extractors 34 and 36, as well as the ends of the winding conductors 24, will remain within the fixture, though with the winding conductors substantially elevated, such as by way of example shown in FIG. 5.

Figure 2:
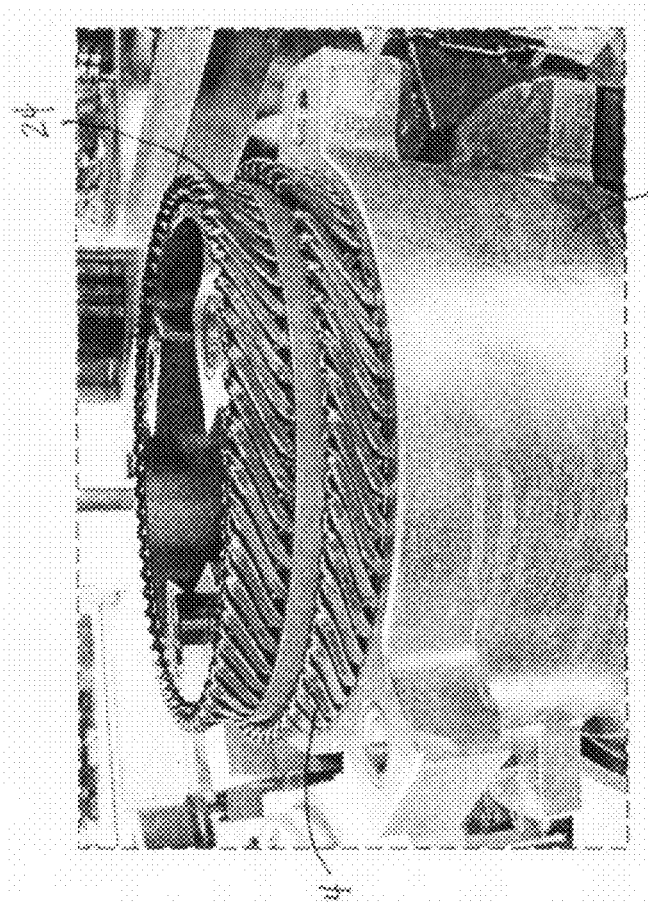
FIG. 2 shows a twisting fixture for simultaneously bending hairpin conductors to form rotor or stator conductors.
Figure 3:
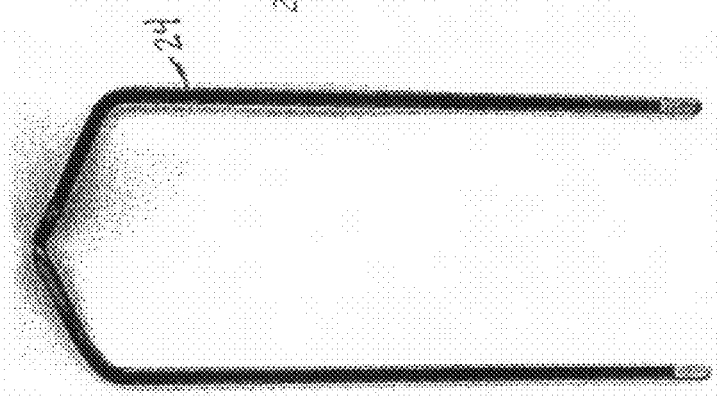
FIG. 3 shows a stator or winding conductors as bent in the twisting machine from a hairpin conductors of FIG. 1.
Figure 8:
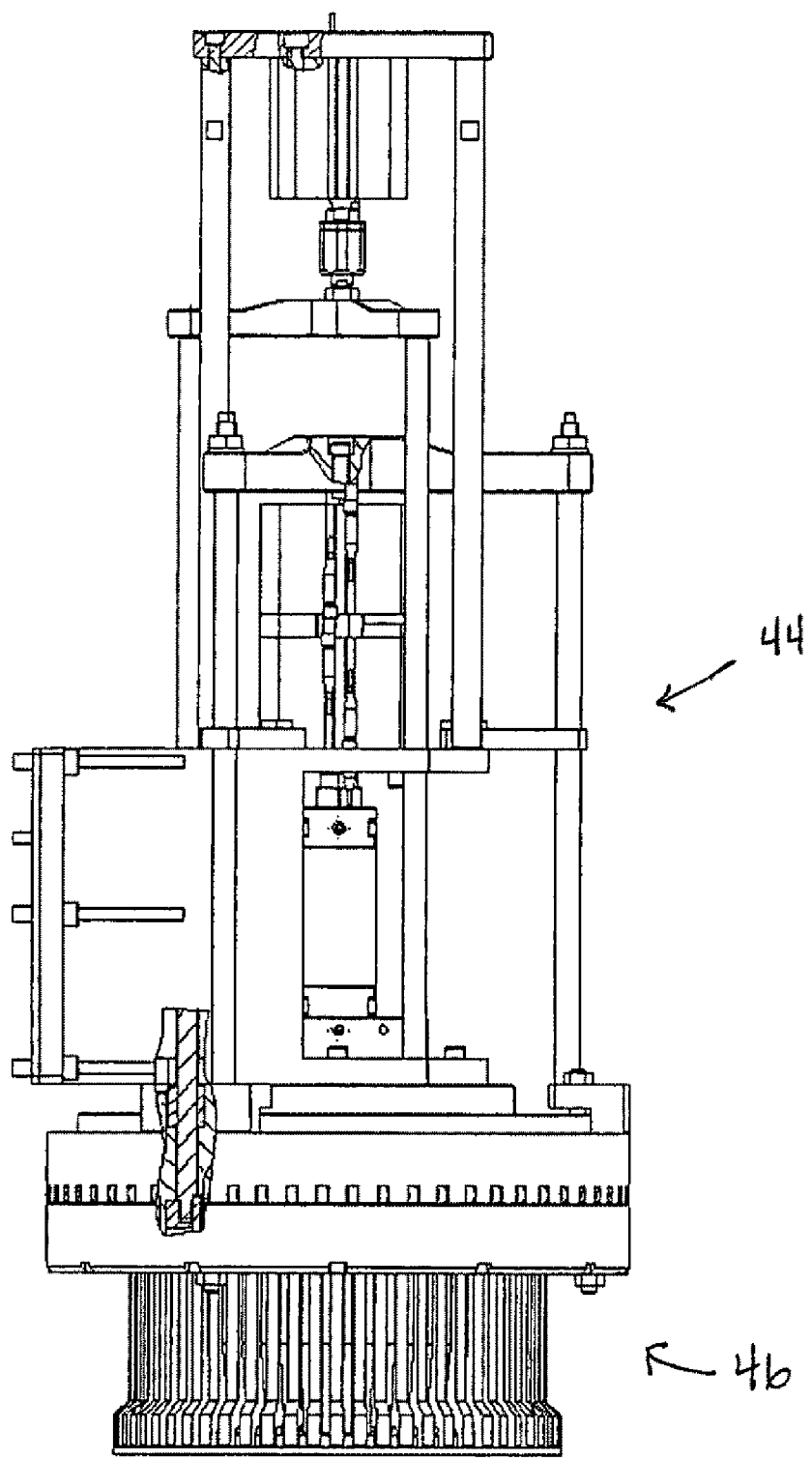
FIG. 8 illustrates a clamp assembly used to remove winding conductors from the twisting fixture and place the same in a rotor or stator.
Figure 9:
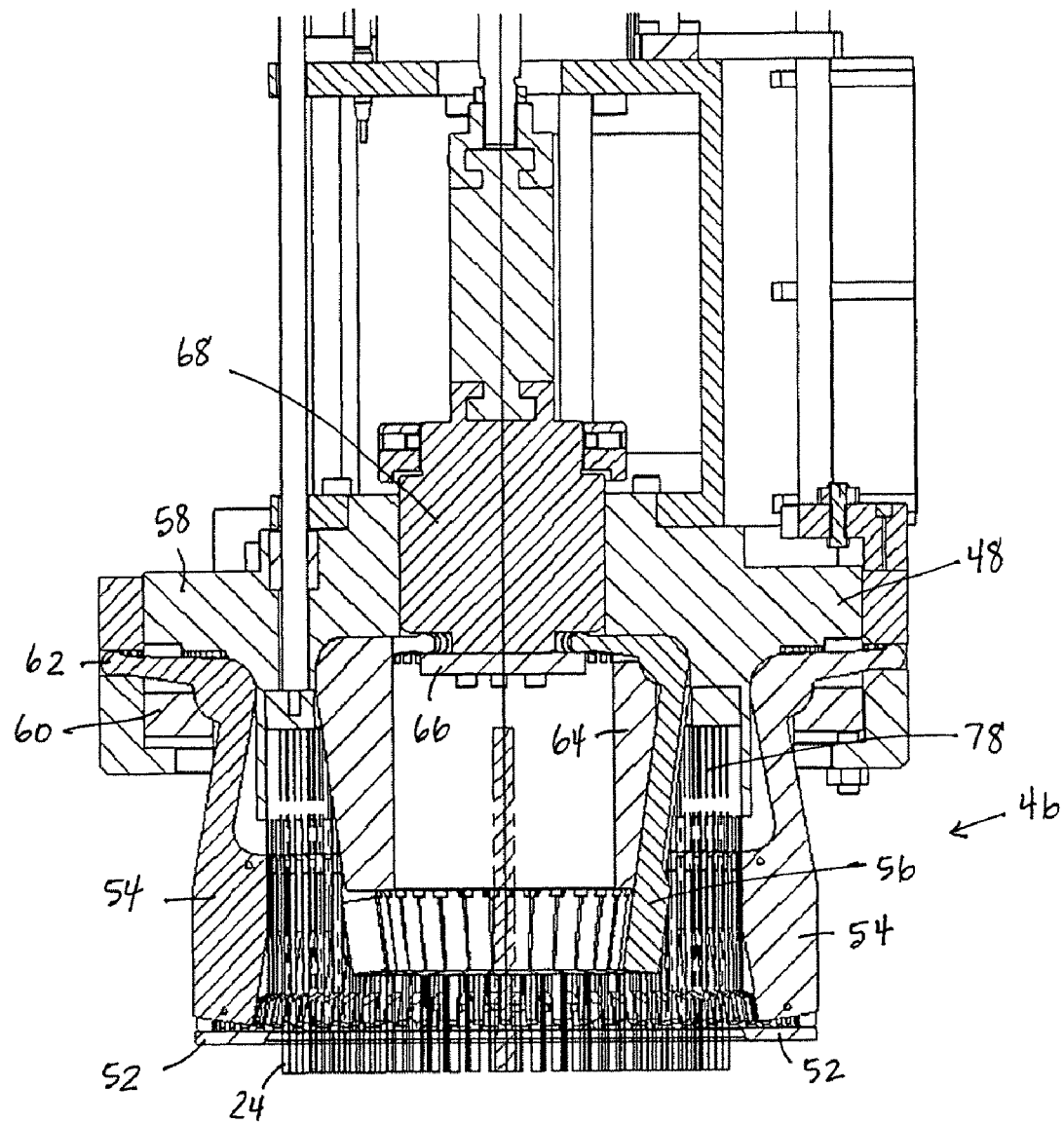
FIG. 9 is a side cross section of the clamp assembly of FIG. 8.

Above the extractor station 28 (FIG. 4) is a clamp assembly shown in side view in FIG. 8. This assembly may be raised to allow for rotation of table 26 with the fixture 22 to the extraction station 28 before the wire conductors are elevated from their positions shown in FIG. 2, and then lowered so that the bottom thereof is just above the top of the fixture 22. The clamp assembly, generally indicated by the numeral 44 in FIG. 8, has a clamp subassembly 46 on the lower part thereof. The clamp subassembly may be seen in the side cross-section of FIG. 9, which illustrates not only the clamp subassembly 46 but also the relative position of the winding conductors 24 therein just before or as clamped. The clamping subassembly 46 has a body member 48, a part of which is shown in FIG. 10. In particular, the body member 48 has a plurality of downward protrusions 50 equal in number to the number of slots in the rotor or stator and in the fixture 22, sixty in the exemplary embodiment (FIG. 2). As may be seen in FIG. 10, each of the projections 50 have a screw hole therein for attachment of stabilizing plate 52 (FIG. 9) in the clamp subassembly.

Referring again to FIG. 9, the clamp subassembly 46 has a plurality of outer fingers 54 and inner fingers 56, only one of which is visible in FIG. 9. The outer fingers 54 fit between projections 50 and are captured for rotation between parts 58 and 60 and driven in rotation by arm 62 when the assembly including members 58 and 60 is raised or lowered. Similarly, fingers 56 are mounted for rotation between members 64 and 48 and are captured and driven in rotation by members 66 and 68. Exemplary fingers may be seen in FIGS. 11a and 11b. Finger 54 of FIG. 11b slides between each group of four legs of the winding conductors and thus are equal in number to the slots in the rotor or stator and in the fixture 22. For that purpose, they are tapered on surfaces 60 to hold the winding conductors in the proper spaced apart condition while assuring that when the clamp subassembly is raised, the winding conductors must also be raised because of the shape of the surface of the wedge 60 and region 62. Fingers 56 shown in FIG. 11a have a surface 64 that will span two slots, and accordingly, only thirty such fingers are used in the exemplary embodiment. The surface 64 is appropriately curved so as to radially contact the inner surface of the legs of the inner winding conductors to support the same, thereby preventing the inadvertent deflection of the winding conductors radially inward when the clamping subassembly clamps the wire conductors. In that regard, to clamp the wire conductors, members 58 and 66 are moved downward to cause fingers 56 to move outward to support the inner diameter of the conductor wires, and members 58 and 60 are also moved downward to cause fingers 54 to move between conductor wires to both properly grip and space the conductor wires.

Figure 12:
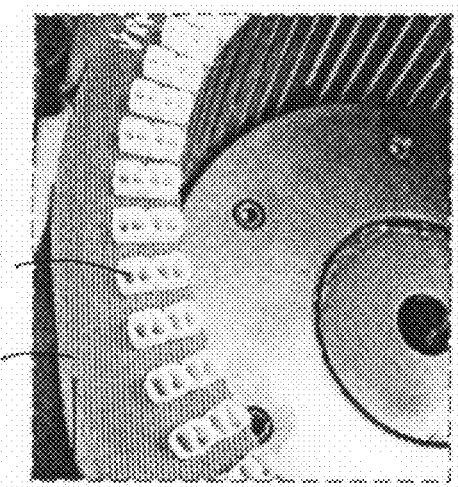
FIG. 12 presents an exemplary stator 32 with insulators therein.
Figure 13:
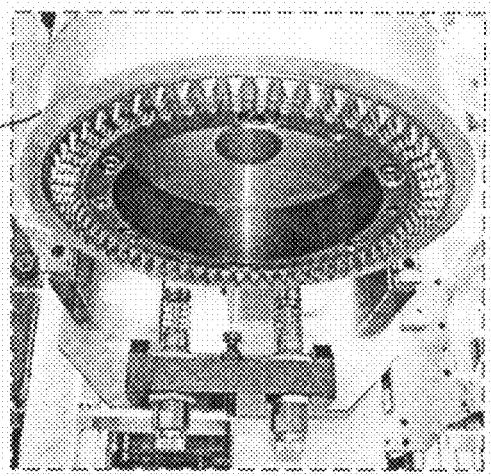
FIGS. 13 and 14 illustrate the swaging fixture for swaging one end of insulators in a rotor or stator.
Figure 14:
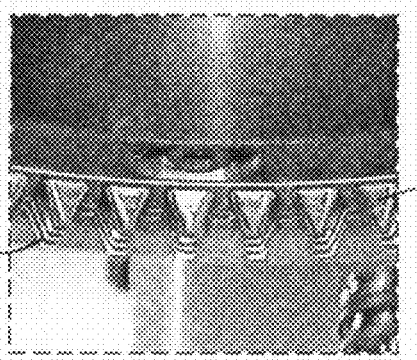

While the extraction station 28 (FIG. 4) is operating as described above, a stator core having insulators therein is loaded into the system at station 70 (FIG. 4), either manually or automatically, into a fixture providing precise positional and angular location thereof. A portion of an exemplary stator 32 with insulators 72 therein may be seen in FIG. 12. The insulators are of typical insulation paper commonly used, and are automatically placed in the stator slots in other equipment. As may be seen in FIG. 12, the insulators are slightly longer than the stator core itself, and accordingly, somewhat project out of the stator core on both sides thereof, one side being visible in FIG. 12. Once the stator with insulators is loaded into station 70, a swaging assembly 74, shown in FIG. 13, with four rows of projections 76, shown in FIG. 14, extending into the insulators to swage or expand the same in the circumferential direction. During this operation, movement of the insulators deeper into the stator slots is prevented by a backup plate supporting the opposite ends of the insulators. The swaging as described has at least two advantages. First, it assists in the feeding of the ends of the winding conductors into the appropriate insulator opening. Secondly, it prevents a winding conductor from simply pushing the insulator deep into the slot.

Once the conductor wire extraction at station 28 and the swaging operation at station 70 (FIG. 4) are complete, assembly 30 is rotated to bring the clamp subassembly 46 (FIGS. 8 and 9) over the insulated stator or insulated rotor and lowered so that the lower ends of the winding conductors extend into the appropriate insulator in the insulated slots. Thereafter, members 58 and 60 (FIG. 9) are raised, as are members 66 and 68, releasing the winding conductors 24, with an extractor 78 visible in FIG. 9 being lowered to be sure none of the winding conductors remain retained by any of fingers 54 or 56. The entire clamp assembly 44 (FIG. 8) is then raised and rotatable assembly 30 is rotated back through 180° for the repeat of the process.

Thus in accordance with the present invention, rectangular winding conductors formed in a twisting fixture are all simultaneously removed from the twisting fixture and automatically placed in an insulated stator or insulated rotor, with the winding conductors 24 standing relatively high in the rotor or stator as shown in FIG. 5. In a later stage of the fabrication process, the winding conductors 24 will be pushed down into the stator or rotor to their final elevation, ready for connections to be made at the other side of the stator or rotor.

While a preferred embodiment of the present invention has been disclosed and described herein for purposes of illustration and not for purposes of limitation, it will be understood by those skilled in the art that various changes in form and detail may be made therein without departing from the spirit and scope of the invention.

What is claimed is:

1. A method of removing from a twisting fixture and inserting into a rotor or stator a plurality of rectangular winding conductors each having a pair of legs separated by an amount equal to the distance between a predetermined number of rotor or stator slots in which they will be inserted and integrally connected at one end thereof, comprising:

with the legs of the winding conductors being aligned, each on a radial line from a center axis of the twisting fixture, the radial lines being equally angularly spaced about the center axis of the twisting fixture by a predetermined angle, placing a clamping assembly adjacent the twisting fixture, the clamping assembly having a plurality of outer fingers equally angularly spaced about the center axis of the twisting fixture by the predetermined angle and a plurality of inner fingers equally angularly spaced about the center of the twisting fixture by the predetermined angle, the outer fingers being radially outward of the winding conductors and the inner fingers being radially inward of the winding conductors;

moving the inner fingers radially outward and the outer fingers radially inward to project between legs of the winding conductors and between the integral connections of the legs and the twisting fixture;

separating the clamping assembly and the twisting fixture, and with the center axes of the clamping assembly and the rotor or stator aligned and with the clamping assembly and the rotor or stator angularly aligned about their center axes with respect to each other, bringing the clamping assembly adjacent the rotor or stator to insert free ends of the winding conductors into the rotor or stator; and, moving the inner fingers radially inward and the outer fingers radially outward beyond the winding conductors.

2. The method of claim 1 wherein moving the inner fingers radially outward and the outer fingers radially inward to project between legs of the winding conductors and between the integral connections of the legs and the twisting fixture comprises moving the inner fingers radially outward to support the legs of the winding conductors against radially inward deflection, and moving the outer fingers radially inward to project between legs of the winding conductors and between the integral connections of the legs.

3. The method of claim 2 wherein the outer fingers wedge between the legs of the winding conductors when moved radially inward.

4. The method of claim 2 wherein the outer fingers are mounted on arms disposed on the clamping assembly for rotation about an axis in a plane perpendicular to the center axis of the clamping assembly and perpendicular to a radial line to the respective outer finger, and the inner fingers are mounted on arms disposed on the clamping assembly for rotation about an axis in a plane perpendicular to the center axis of the clamping assembly and perpendicular to a radial line to the respective inner finger.

5. The method of claim 4 wherein the inner fingers and the outer fingers are moved by control of a common actuator.

6. The method of claim 2 wherein the inner fingers and the outer fingers are moved by control of a common actuator.

7. The method of claim 1 wherein the outer fingers are mounted on arms disposed on the clamping assembly for rotation about an axis in a plane perpendicular to the center axis of the clamping assembly and perpendicular to a radial line to the respective outer finger, and the inner fingers are mounted on arms disposed on the clamping assembly for rotation about an axis in a plane perpendicular to the center axis of the clamping assembly and perpendicular to a radial line to the respective inner finger.

8. The method of claim 7 wherein the inner fingers and the outer fingers are moved by control of a common actuator.

9. The method of claim 1 wherein the inner fingers and the outer fingers are moved by control of a common actuator.

10. The method of claim 1 wherein the ends of the winding conductors are guided into the rotor or stator with the aid of tapering the free ends of the winding conductors.

11. The method of claim 10 wherein the free ends of the winding conductors are inserted into an insulated rotor or stator.

* * * * *